United States Patent
Ellis et al.

(10) Patent No.: US 12,030,274 B2
(45) Date of Patent: Jul. 9, 2024

(54) ARTICLE WITH 2D AND 3D FIBER STRUCTURE

(71) Applicant: AEROJET ROCKETDYNE, INC., Sacramento, CA (US)

(72) Inventors: Russell A. Ellis, Saratoga, CA (US); Jeffrey D. Haynes, Stuart, FL (US)

(73) Assignee: AEROJET ROCKETDYNE, INC., Sacramento, CA (US)

( * ) Notice: Subject to any disclaimer, the term of this patent is extended or adjusted under 35 U.S.C. 154(b) by 0 days.

(21) Appl. No.: 17/782,772

(22) PCT Filed: Feb. 20, 2020

(86) PCT No.: PCT/US2020/019017
§ 371 (c)(1),
(2) Date: Jun. 6, 2022

(87) PCT Pub. No.: WO2021/167612
PCT Pub. Date: Aug. 26, 2021

(65) Prior Publication Data
US 2023/0010439 A1    Jan. 12, 2023

(51) Int. Cl.
*B32B 1/08* (2006.01)
*B32B 5/10* (2006.01)
(Continued)

(52) U.S. Cl.
CPC .................. *B32B 1/08* (2013.01); *B32B 5/10* (2013.01); *B32B 5/12* (2013.01); *B32B 9/007* (2013.01);
(Continued)

(58) Field of Classification Search
CPC .... B32B 1/08; B32B 5/10; B32B 5/12; B32B 9/007
(Continued)

(56) References Cited

U.S. PATENT DOCUMENTS

| 4,847,063 A * | 7/1989 | Smith | C04B 35/83 87/9 |
| 4,854,990 A * | 8/1989 | David | B29C 70/24 156/425 |
| 2020/0040909 A1 * | 2/2020 | Jain | F01D 25/26 |

FOREIGN PATENT DOCUMENTS

| EP | 2977198 | 1/2016 |
| FR | 2624111 | 6/1989 |

OTHER PUBLICATIONS

International Preliminary Report on Patentability for International Application No. PCT/US2020/019017 mailed Sep. 1, 2022.
(Continued)

*Primary Examiner* — Tahseen Khan
(74) *Attorney, Agent, or Firm* — Carlson, Gaskey & Olds, P.C.

(57) ABSTRACT

An article includes a completed fabric structure that has multiple plies of fiber reinforced fabric. A first portion of the fabric structure has a three-directional fiber reinforced configuration and, exclusive of the first portion, a second portion of the fabric structure having a two-directional fiber reinforced configuration. In the three-directional fiber reinforced configuration there are multiple plies that are bound together via a matrix and a plurality of fibers normal through the multiple plies. In the two-directional fiber reinforced configuration the multiple plies are bound to one another via the matrix and not fibers normal through the multiple plies.

13 Claims, 3 Drawing Sheets

(51) Int. Cl.
  *B32B 5/12* (2006.01)
  *B32B 9/00* (2006.01)
(52) U.S. Cl.
  CPC ..... *B32B 2250/20* (2013.01); *B32B 2262/105* (2013.01); *B32B 2262/106* (2013.01); *B32B 2262/12* (2013.01); *B32B 2305/08* (2013.01); *B32B 2305/18* (2013.01); *B32B 2313/04* (2013.01); *B32B 2315/02* (2013.01); *B32B 2605/08* (2013.01)
(58) Field of Classification Search
  USPC .......................................................... 428/137
  See application file for complete search history.

(56) References Cited

OTHER PUBLICATIONS

International Search Report for International Application No. PCT/uS2020/019017 mailed Sep. 30, 2020.

\* cited by examiner

ARTICLE WITH 2D AND 3D FIBER STRUCTURE

BACKGROUND

Thrust nozzles, such as those used with reaction engines in high speed vehicles, may be formed of relatively strong, lightweight composite materials. As an example, fiber layers are arranged around a mandrel to form the design shape of the nozzle. The fiber layers are then densified with a ceramic or carbon matrix around the fibers.

SUMMARY

An article according to an example of the present disclosure includes a completed fabric structure having multiple plies of fiber reinforced fabric. A first portion of the fabric structure has a three-directional fiber reinforced configuration through which the multiple plies are bound together via a matrix and a plurality of fibers normal through the multiple plies. A second portion of the fabric structure has a two-directional fiber reinforced configuration through which the multiple plies are bound to one another via the matrix and not fibers normal through the multiple plies.

In a further embodiment of any of the foregoing embodiments, the matrix is a carbon matrix.

In a further embodiment of any of the foregoing embodiments, the first portion is an attachment portion for relatively highly load-bearing.

In a further embodiment of any of the foregoing embodiments, the completed fabric structure is axisymmetric.

In a further embodiment of any of the foregoing embodiments, the completed fabric structure is conical.

In a further embodiment of any of the foregoing embodiments, the attachment portion is an annular end portion of the completed fabric structure.

In a further embodiment of any of the foregoing embodiments, in the three-directional fiber reinforced configuration the multiple plies and the fibers normal through the multiple plies together define a total fiber volume, and 10% to 25% of the total fiber volume are the fibers normal through the multiple plies.

In a further embodiment of any of the foregoing embodiments, the multiple plies are continuous through the first portion and the second portion.

In a further embodiment of any of the foregoing embodiments, the multiple plies are silicon carbide fibers.

A vehicle according to an example of the present disclosure includes an engine, and a nozzle attached to the engine. The nozzle has an axisymmetric body formed of a fiber-reinforced composite. The axisymmetric body has at least one attachment portion that is relatively highly load-bearing, and adjacent to the at least one attachment portion, a non-attachment portion that is relatively low load-bearing. The fiber-reinforced composite has a three-directional fiber reinforced configuration in the at least one attachment portion and a two-directional fiber reinforced configuration in the non-attachment portion.

In a further embodiment of any of the foregoing embodiments, the two-directional fiber reinforced configuration and the three-directional fiber reinforced configuration both include in-plane fibers, the three-directional fiber reinforced configuration additionally includes fibers normal through the in-plane fibers, and the Z-fibers normal through the in-plane fibers are deflected fibers.

In a further embodiment of any of the foregoing embodiments, in the three-directional fiber reinforced configuration the in-plane fibers and the fibers normal through the in-plane fibers together define a total fiber volume, and 10% to 25% of the total fiber volume are the fibers normal through the in-plane fibers.

In a further embodiment of any of the foregoing embodiments, the fiber-reinforced composite is continuous through the at least one attachment portion and the non-attachment portion, and the fiber-reinforced composite is selected from the group consisting of a carbon matrix/carbon fiber composite and a carbon matrix/silicon carbide fiber composite.

In a further embodiment of any of the foregoing embodiments, the non-attachment portion surrounds the attachment portion.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
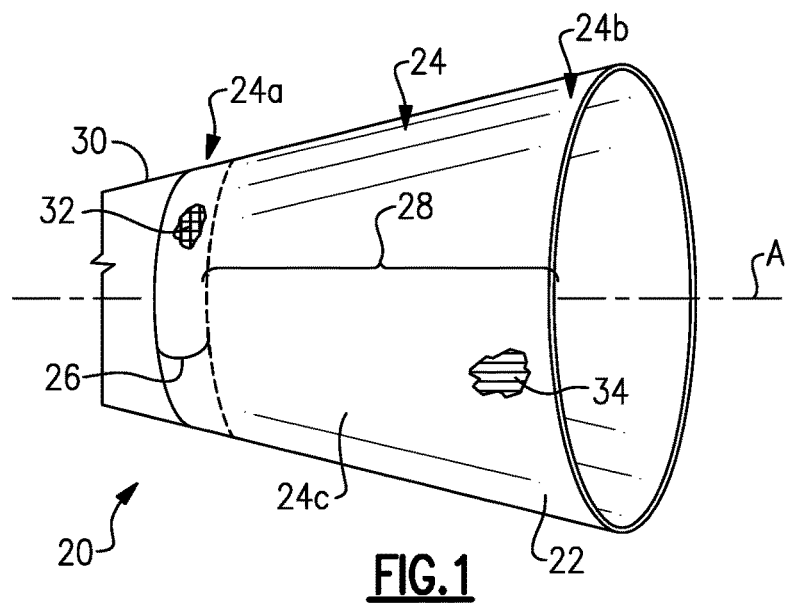
FIG. 1 illustrates an example article that is formed of a multi-layer fiber-reinforced composite with both two- and three-directional fiber-reinforcement configurations.

Articles that are subject to high temperature end-use environments may be formed of fiber-reinforced composites, such as carbon/carbon or carbon/silicon carbide composites. The article shape can be fabricated from fiber sheets or fiber tapes that are wrapped around a mandrel or laid-up in a moldform, and then densified with a carbon matrix. This forms a multi-layer, two-dimensional fiber-reinforced structure. Alternatively, the article can be fabricated from a three-dimensional fiber-reinforced fabric and then densified with a carbon matrix to form a multi-layer, three-dimensional fiber-reinforced structure. The three-dimensional fiber-reinforced structure may enhance strength, but is more expensive to fabricate than the two-dimensional fiber-reinforced structure. Conversely, the two-dimensional fiber-reinforced structure is less expensive to fabricate, but generally has lower strength. FIG. 1 schematically illustrates an example article 20. As will be described in further detail herein, the article 20 is formed of a multi-layer fiber-reinforced composite 22 that has both a three-dimensional fiber-reinforced portion and a two-dimensional fiber-reinforced portion.

Referring to FIG. 1, the article 20 includes a body 24 that is formed of the multi-layer fiber-reinforced composite 22. In this example, the body 24 is axisymmetric about central axis A. In the example shown, the body 24 is conical and generally includes a first axial end portion 24*a*, a second axial end portion 24*b*, and an intermediate portion 24*c* that diverges from the first end 24*a* to the second end 24*b*. The interior region of the body 24 is hollow. It is to be appreciated that although a conical shape is depicted, the body 24 may alternatively have a cylindrical shape or a contoured or partially contoured shape.

The body 24 includes at least two distinctive portions, i.e. a first portion 26 and, exclusive of the first portion 26, a second portion 28. In this example, the portion 26 is an attachment portion that is relatively heavily loaded, and the portion 28 is a non-attachment portion that is relatively lightly loaded. The portion 26 is the region of the body 24 at which a mating component 30 is attached, such as by bolting, clamping, etc. In this regard, the portion 26 may be, but is not limited to, a lip, flange, inset, outset, boss, or the like to which the component 30 attaches and supports the body 24. As the load of the body 24 is supported at the attachment, the portion 26 is heavily loaded and is thus subjected to substantially higher mechanical stress than the lightly-loaded non-attachment portion 28. It is to be appreciated, however, that the portions 26/28 are not limited to attachment or non-attachment regions, and that the portions 26/28 may be configured based on operational structural requirements and temperatures. As will be appreciated, although a single attachment portion 26 is shown, further examples of the article 20 include one, two, three, or more than three additional attachment portions 26.

Due to the portion 28 being lightly loaded, the portion 28 need not be as strong as the portion 26. Conversely, due to the portion 26 being relatively heavily loaded, the portion 26 requires higher strength than the portion 28. Again, the portions 26/28 need not be associated with loading level and may alternatively be based on operational structural requirements and temperatures. In this regard, as shown in cutaway, the multi-layer fiber-reinforced composite 22 has a three-directional fiber-reinforced configuration 32 in portion 26 and a two-directional fiber-reinforced configuration 34 in the portion 28.

Figure 2:
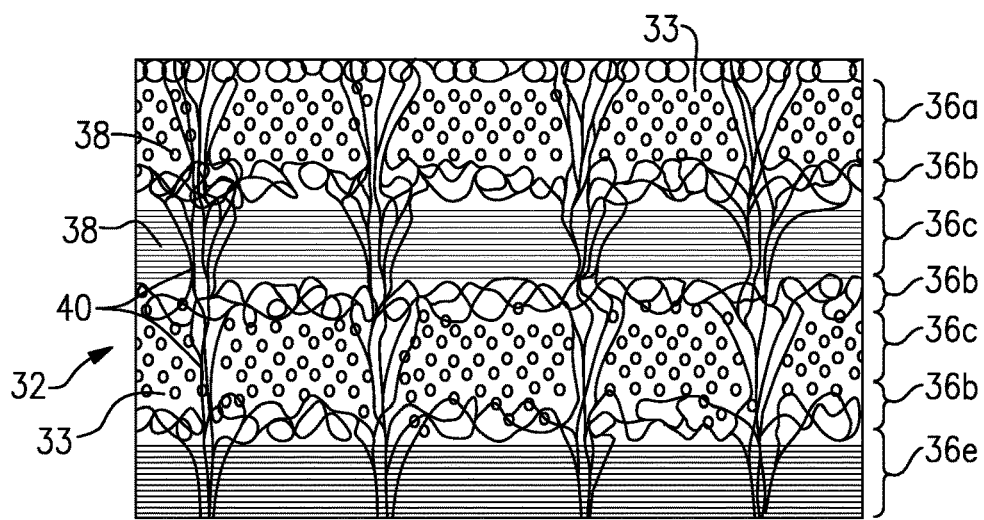
FIG. 2 illustrates an example three-directional fiber-reinforcement configuration.

FIG. 2 illustrates a sectioned view of an example of the three-directional fiber-reinforced configuration 32, disposed in matrix 33 (located between fibers). The configuration 32 is formed of multiple fiber plies or layers 36*a*/36*b*/36*c* comprised of in-plane fiber-reinforced fabric 38 (hereafter "fibers 38"). The in-plane fibers 38 generally lie in an X-Y plane of the respective fiber layer 36*a*/36*b*/36*c*. Each fiber layer 36*a*/36*b*/36*c* may itself have a different fiber configuration. One example configuration is a unidirectional fiber configuration (all fibers oriented in X-direction or Y-direction), but other configurations, such as but not limited to, two-dimensional fabric and weave configurations can additionally or alternatively be used as long as they permit conversion to the three-directional fiber configuration 32 as discuss later below. The fibers 38 are high-strength fibers, such as carbon fibers or ceramic fibers (e.g., silicon carbide fibers.

The three-directional fiber-reinforcement configuration 32 additionally includes Z-direction fibers 40 that are oriented normal to, and extend through, the in-plane fibers 38 of the layers 36*a*/36*b*/36*c*. The Z-direction fibers 40 together with the matrix 33 bound the layers 36*a*/36*b*/36*c* together and are generally perpendicular to the in-plane fibers 38 within a cone of about 10°. The Z-direction fibers 40 are oriented crosswise in a processing operation during fabrication. Example processing operations include needling, sewing, or tufting. In one example, the Z-direction fibers 40 are fibers that initially were in-plane and then deflected in the processing operation to be reoriented. As indicated above, the second portion 28 is exclusive of the first portion 26. The term "exclusive" is made with reference to the spatial region that encompasses all of the Z-direction fibers 40 of a group of Z-direction fiber 40. For instance, the Z-direction fibers 40 may be provided in a pattern. The pattern is indicative of association of all of the Z-direction fibers 40 that are part of the pattern. As an example, four Z-direction fibers 40 that are evenly spaced apart as four corners of a rectangle are part of the same group, and the outline or profile of the rectangle pattern constitutes the extent of the portion 28. As will be appreciated, the portion 28 encompasses the localized regions between adjacent Z-direction fibers 40 in a pattern, and those localized regions are thus part of the portion 28 rather than the portion 26.

Figure 3:
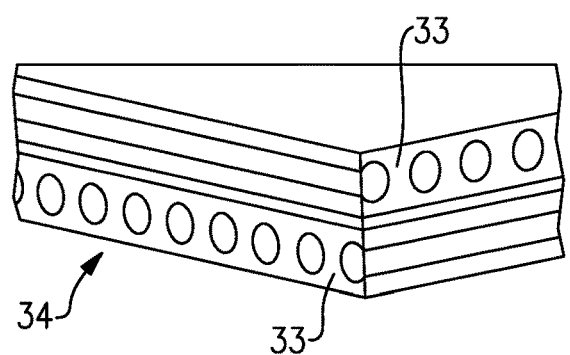
FIG. 3 illustrates an example two-directional fiber-reinforcement fiber configuration.
Figure 4:
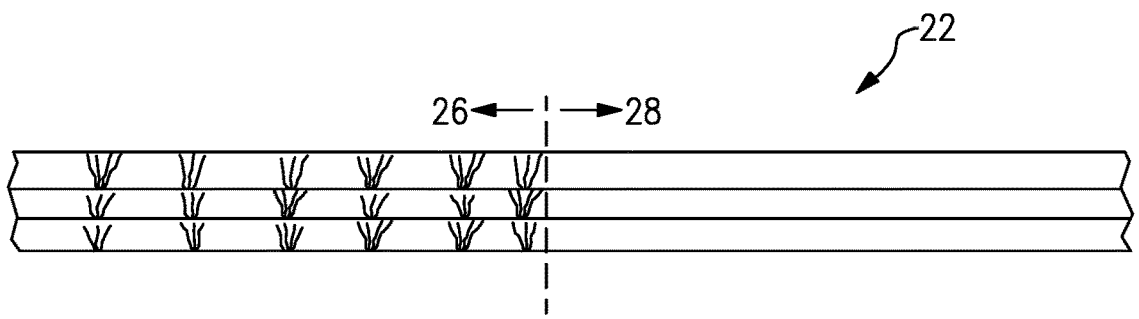
FIG. 4 illustrates continuous fiber layers between adjacent two- and three-directional fiber-reinforcement configurations.

FIG. 3 illustrates a sectioned view of an example of the two-directional fiber-reinforced configuration 34, also disposed in the matrix 33 (located between fibers). The configuration 34 is also formed of the layers 36*a*/36*b*/36*c* comprised of the in-plane fibers 38. That is, the layers 36*a*/36*b*/36*c* are continuous across the portions 26/28. The layers 36*a*/36*b*/36*c* in the two-directional fiber-reinforced configuration 34 are bound by the matrix 33, but the two-directional fiber-reinforced configuration 34 excludes any Z-direction fibers, i.e., there are no fibers normal through the two-directional fiber-reinforced configuration 34. As depicted in FIG. 4, the multi-layer fiber-reinforced composite 22 is continuous across the portions 26/28 in that the layers 36*a*/36*b*/36*c* extend without termination between the portion 26 and the portion 28.

The in-plane fibers 38 provide good strength in the X-Y plane. Without reinforcement in the Z-direction, however, the two-directional fiber-reinforced configuration 34 in the final consolidated article 20 has relatively low shear strength along the interfaces of the fiber layers 36*a*/36*b*/36*c* and relatively low tensile strength in the Z-direction. However, since high strength is not required in the relatively lightly-loaded non-attachment portion 28, the two-directional fiber-reinforced configuration 34 can provide the minimal structural requirements.

Z-direction fibers 40 of the three-dimensional fiber configuration 32 provide relatively higher shear strength along the interfaces of the fiber layers 36*a*/36*b*/36*c* in the final consolidated article 20 and relatively higher tensile strength in the Z-direction. Thus, the three-dimensional fiber configuration 32 is used in the attachment portion 26 that is relatively heavily loaded. The article 20 thereby provides a combination of the three-directional fiber configuration 32 and the two-directional fiber configuration 34 to obtain localized strength of the three-dimensional fiber configuration 32 and the relatively low cost of the two-dimensional fiber configuration 34 across portions that do not require high strength.

The article 20 may be fabricated in a fiber layer assembly process to produce the desired geometry of the article 20. Such a process may employ known techniques for fabrication of multi-layer two-dimensional configurations. As an example, for an axisymmetric article, the fiber-reinforced layers can be assembled by spiral-winding fiber tapes onto a mandrel, arranging fiber-reinforced sheets onto a mandrel, or arranging fiber-reinforced sheets in an involute manner around a mandrel. For non-hollow articles, such as flat or shaped panels, the fiber tapes or sheets can be assembled by a lay-up process in a moldform that corresponds to the geometry of the article.

Upon completion of the build-up of the fiber sheets into the desired thickness, all of the fiber-reinforced sheets are of the two-directional reinforced configuration. Thereafter, the two-directional fiber-reinforced configuration in the region that corresponds to portion 26 is converted to the three-directional fiber-reinforced configuration. The process for conversion may include needling, sewing, or tufting, which in general are well-understood processes. Needling is relatively fast and low cost. In needling, multiple barbed needles are pushed through the fiber layers along the Z-direction. The barbs catch some of the fibers on the way through. As the needle continues through, it pulls the caught fibers with it, thereby deflecting those fibers to reorient them in the Z-direction. All of the fibers of the three-directional fiber configuration 32 and the two-directional fiber configuration 34 constitute a completed fabric structure in which no additional Z-direction fibers will be created. That is, the completed fabric structure has the fiber structure that will be in the final article 20.

For the article 20, the needling or other conversion process is conducted only in the region 26 to convert the initial two-directional fiber-reinforced configuration to the three-directional fiber-reinforced configuration. As will be appreciated, the spacing between needling locations for the Z-direction fibers 40 and the volume fraction of Z-direction fibers 40 at a needle location may be adjusted in order to increase or decrease the overall volume of Z-direction fibers 40 and thereby adjust strength. In one example of the article 20, the in-plane fibers 38 and the Z-direction fibers 40 together define a total fiber volume, and—typically—10% to 25% of the total fiber volume is the Z-direction fibers 40.

The needling or other conversion process may also be conducted at different points of progression in the fabrication process with regard to densification of the matrix 33. For instance, in some processes the fiber-reinforced layers that are initially assembled into the desired geometry of the article 20 are pre-impregnated with resin, such as phenolic resin. The assembled pre-impregnated fiber-reinforced layers are then cured at relatively low temperature and pressure. This structure is then pyrolyzed at a higher temperature to drive off volatiles and carbonize the resin. Most typically, this is followed by one or more cycles of impregnating with additional resin, curing, and pyrolyzing to add carbon matrix and achieve higher density. In one example, the needling is conducted prior to the first curing. In another example, the needling is conducted after the first pyrolyzation. The latter point is useful in that the resin/carbon structure may be somewhat rigid, which facilitates maintaining the structure intact without damage when moving between the heating equipment and the needling or other processing equipment.

Alternatively, dry fiber-reinforced layers may be used to build the layers into the desired thickness and geometry. Particularly for dry carbon fiber-reinforced layers, the fibers may initially be full carbon or partial carbon in the "as-received" condition from the fabric vendor. The partially-carbonized fabric is sometimes referred to as pre-oxidized fiber and is typically a PAN-based material that has been partially converted to carbon. Partial carbonized fabric layers are generally more flexible than fully carbonized fabric layers and may thus facilitate handling. In one example, where dry layers of fully-carbonized or partially-carbonized fabric are used to build the fiber layers into the desired thickness and geometry, the needling or other conversion process is conducted as the layers are applied onto the mandrel or moldform. The structure may not be self-supporting and thus may be difficult to move to other processing equipment without damage. Whether fully-carbonized or partially-carbonized fabric or resin cured or no curing, once all of the Z-direction fibers 40 are created, the fibers of the three-directional fiber configuration 32 and the two-directional fiber configuration 34 are substantially in the completed fabric structure.

As will also be appreciated, alternatives to densification by polymer pyrolysis can alternatively be used, such as but not limited to, vapor infiltration. Additionally, the initial fiber layers can be modified to facilitate the needling. For example, the fiber layers can include discontinuous fibers, such as stretch-broken layers in which the fibers are pre-broken, that reduce the needling force and facilitate catching and reorienting the fibers. A further modification may include, but are not limited to, alternating continuous and discontinuous fiber layers.

Figure 5:
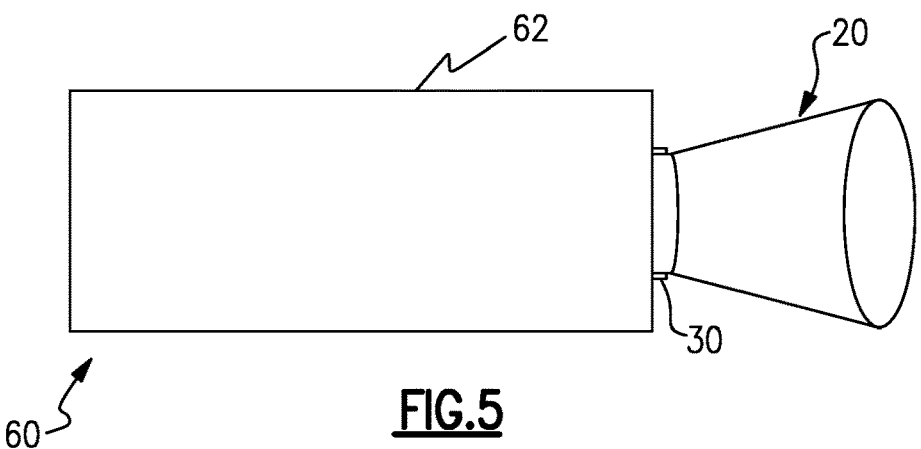
FIG. 5 illustrates an example vehicle that has a nozzle formed of a multi-layer fiber-reinforced composite with both two- and three-directional fiber-reinforcement configurations.

FIG. 5 illustrates an example implementation of the article 20. In this example, the article 20 is part of a vehicle 60, such as a high-speed vehicle for carrying humans into outer-space. The vehicle 60 includes an engine 62 that is attached via the mating component 30 to the article 20, which here is in the form of a conical or contoured thrust nozzle. Additionally or alternatively, the article 20 may be in the form of a nozzle extension that is attached to the downstream end of a nozzle. The engine 62 may include one or more propellants and, depending on the design, a combustion chamber, pumps, injectors, and other known components.

Figure 6:
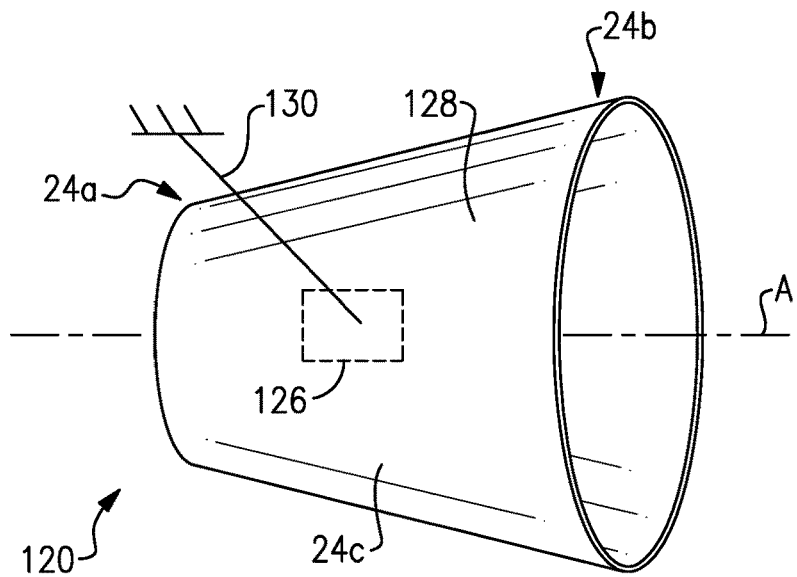
FIG. 6 illustrates another example article that is formed of a multi-layer fiber-reinforced composite with both two- and three-directional fiber-reinforcement configurations.

FIG. 6 illustrates another example article 120. The article 120 is the same as the article 20 except that instead of, or in addition to, the attachment portion 26 on an axial end, there is an attachment portion 126 in the intermediate portion 24c that diverges from the first end 24a to the second end 24b. In this example, the portion 126 is an "island" that is encompassed by the non-attachment portion 128. As above, the attachment portion 126 is formed of the three-dimensional fiber configuration 32, and the non-attachment portion 128 is formed of the two-dimensional fiber configuration 34. Here, the attachment portion 126 is attached with a mating component 130, such as a support arm. The support arm may be a fixed arm or a moveable arm that serves as an actuator to adjust vectoring of the article 120 (for a nozzle implementation).

Figure 7:
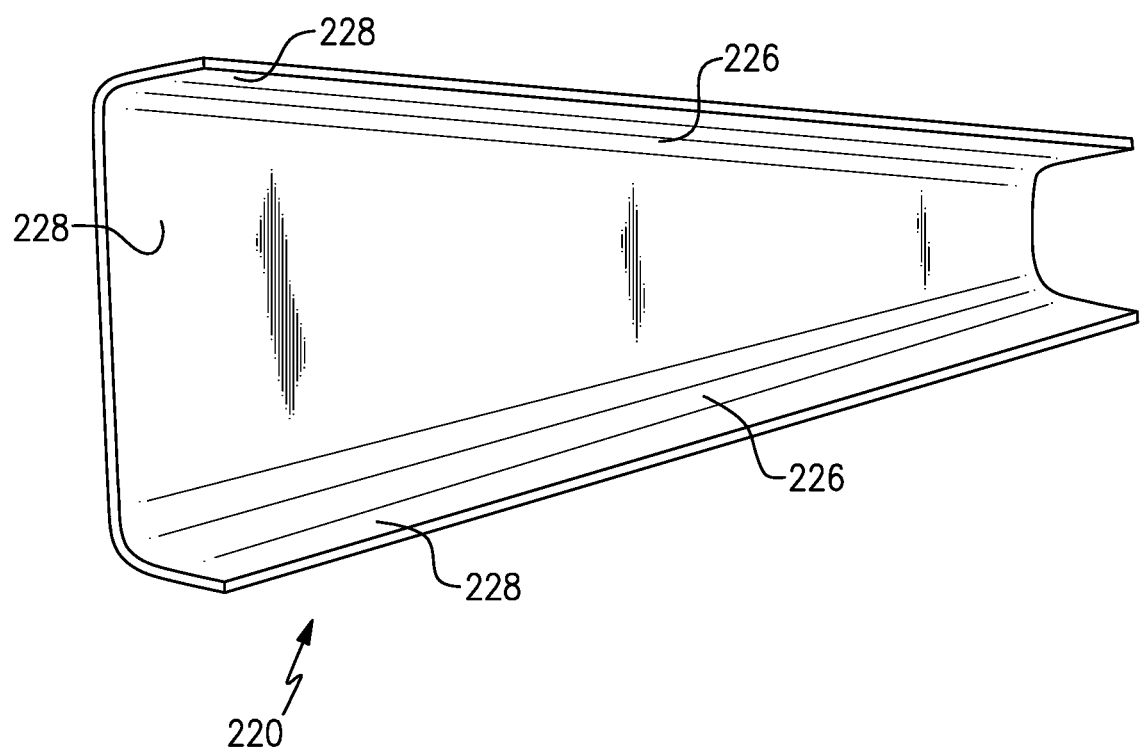
FIG. 7 illustrates an example article that is a vehicle body component.

FIG. 7 illustrates another example article 220. The article 220 is a component of a vehicle body and is an example of a panel-type geometry. In this example, second portions 228 are substantially flat, and first portions 226 are corners. The second portions 226 have the two-directional fiber-reinforced configuration, as discussed above. The first portions 226 have the three-directional fiber-reinforced configuration as discussed above. In this example, the corners are 90° corners such that the two opposite second portions 228 form opposed sides, with the other of the second portions 228 there between. The three-directional fiber-reinforced configuration of the first portions 226 provide the corners, which may be subject to higher loads, with relatively higher strength. The flat, second portions 228 may be subject to relatively lower loads and thus have the two-directional fiber-reinforced configuration.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An article comprising:
   a completed fabric structure having multiple plies of fiber reinforced fabric;
   a first portion of the fabric structure having a three-directional fiber reinforced configuration through which the multiple plies each having in-plane fibers, wherein the multiple plies are bound together via a matrix and are bound together by a plurality of fibers normal to the in-plane fibers and that extend through the multiple plies, wherein the first portion is an attachment portion for relatively high load-bearing, and in the three-directional fiber reinforced configuration the multiple plies and the fibers normal through the multiple plies together define a total fiber volume, and 10% to 25% of the total fiber volume are the fibers normal through the multiple plies; and
   exclusive of the first portion, a second portion of the fabric structure having a two-directional fiber reinforced configuration through which the multiple plies are bound to one another via the matrix and not fibers normal through the multiple plies, wherein the second portion is a non-attachment portion that is relatively low load-bearing.

2. The article as recited in claim 1, wherein the matrix is a carbon matrix.

3. The article as recited in claim 1, wherein the completed fabric structure is axisymmetric.

4. The article as recited in claim 3, wherein the completed fabric structure is conical.

5. The article as recited in claim 4, wherein the attachment portion is an annular end portion of the completed fabric structure.

6. The article as recited in claim 1, wherein the multiple plies are continuous through the first portion and the second portion.

7. The article as recited in claim 1, wherein the multiple plies are silicon carbide fibers.

8. A vehicle comprising:
   an engine; and
   a nozzle attached to the engine, the nozzle having an axisymmetric body formed of a fiber-reinforced composite, the axisymmetric body including,
      at least one attachment portion that is relatively highly load-bearing, and
      adjacent to the at least one attachment portion, a non-attachment portion that is relatively low load-bearing,
   the fiber-reinforced composite having a three-directional fiber reinforced configuration in the at least one attachment portion and a two-directional fiber reinforced configuration in the non-attachment portion, the three-directional fiber reinforced configuration including multiple plies each having in-plane fibers, wherein the multiple plies are bound together via a matrix and are bound together by a plurality of fibers normal to the in-plane fibers and that extend through the multiple plies, in the three-directional fiber reinforced configuration the in-plane fibers and the fibers normal through the in-plane fibers together define a total fiber volume, and 10% to 25% of the total fiber volume are the fibers normal through the in-plane fibers, and in the two-directional fiber reinforced configuration the multiple plies are bound to one another via the matrix and not fibers normal through the multiple plies.

9. The vehicle as recited in claim 8, wherein the fiber-reinforced composite is continuous through the at least one attachment portion and the non-attachment portion, and the fiber-reinforced composite is selected from the group consisting of a carbon matrix/carbon fiber composite and a carbon matrix/silicon carbide fiber composite.

10. The vehicle as recited in claim 9, wherein the non-attachment portion surrounds the attachment portion.

11. The article as recited in claim 1, wherein the in-plane fibers lie an X-Y plane, and the plurality of fibers normal to the in-plane fibers are in a Z-direction that is orthogonal to the X-Y plane.

12. The article as recited in claim 1, wherein the plurality of fibers normal to the in-plane fibers extend through two or more of the multiple plies.

13. The article as recited in claim 1, wherein the plurality of fibers normal to the in-plane fibers extend through all of the multiple plies.

* * * * *